United States Patent
Pearson et al.

(10) Patent No.: US 9,210,144 B2
(45) Date of Patent: *Dec. 8, 2015

(54) SYSTEM AND METHOD OF AUTHENTICATION

(75) Inventors: Larry B. Pearson, San Antonio, TX (US); Jitender S. Sarpal, Plano, TX (US); Mari Sue Quick, Boerne, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 161 days.

This patent is subject to a terminal disclaimer.

(21) Appl. No.: 13/555,340

(22) Filed: Jul. 23, 2012

(65) Prior Publication Data

US 2012/0291062 A1   Nov. 15, 2012

Related U.S. Application Data

(63) Continuation of application No. 11/314,067, filed on Dec. 21, 2005, now Pat. No. 8,255,981.

(51) Int. Cl.
*H04L 29/06*   (2006.01)

(52) U.S. Cl.
CPC ............ *H04L 63/08* (2013.01); *H04L 63/0838* (2013.01); *H04L 63/18* (2013.01)

(58) Field of Classification Search
CPC ... H04L 63/083; H04L 9/3228; H04L 9/3281; H04L 9/3271; H04L 63/08; H04L 63/0838; H04L 63/18
See application file for complete search history.

(56) References Cited

U.S. PATENT DOCUMENTS

| 5,091,939 | A | * | 2/1992 | Cole et al. ................. 713/183 |
| 5,661,807 | A | | 8/1997 | Guski et al. |
| 5,887,065 | A | | 3/1999 | Audebert |
| 5,991,882 | A | | 11/1999 | O'Connell |
| 6,680,999 | B1 | | 1/2004 | Garcia |
| 6,834,341 | B1 | * | 12/2004 | Bahl et al. ................. 713/156 |
| 6,904,526 | B1 | * | 6/2005 | Hongwei ................... 713/182 |
| 7,240,037 | B1 | * | 7/2007 | Bussell ....................... 705/75 |
| 7,499,704 | B1 | | 3/2009 | Bonner |
| 2002/0016972 | A1 | * | 2/2002 | Ogawa et al. ............. 725/133 |
| 2002/0073416 | A1 | | 6/2002 | Ramsey Catan |
| 2002/0147914 | A1 | | 10/2002 | Arnold |
| 2003/0005446 | A1 | | 1/2003 | Jaff et al. |
| 2003/0172272 | A1 | * | 9/2003 | Ehlers et al. .............. 713/170 |
| 2003/0224795 | A1 | | 12/2003 | Wilhoite et al. |
| 2004/0039911 | A1 | | 2/2004 | Oka et al. |

(Continued)

OTHER PUBLICATIONS

Non-Final Office Action for U.S. Appl. No. 11/314,067 received from the United States Patent and Trademark Office (USPTO) mailed Apr. 7, 2009, 36 pages.
Non-Final Office Action for U.S. Appl. No. 11/314,067 received from the United States Patent and Trademark Office (USPTO) mailed Nov. 24, 2009, 35 pages.
Final Office Action for U.S. Appl. No. 11/314,067 received from the United States Patent and Trademark Office (USPTO) mailed May 26, 2010, 31 pages.

(Continued)

*Primary Examiner* — Taghi Arani
*Assistant Examiner* — Phy Anh Vu
(74) *Attorney, Agent, or Firm* — Toler Law Group, PC

(57) ABSTRACT

In a particular embodiment, a method includes receiving, at a set-top box from a server, a temporary authentication token that enables access to an account accessible by one or more devices. The temporary authentication token is generated after validation by the server of a particular authentication token received at the server from a first device. The first device is distinct from the set-top box. The method further includes initiating, at the set-top box, presentation of the temporary authentication token.

20 Claims, 9 Drawing Sheets

(56) References Cited

U.S. PATENT DOCUMENTS

| | | | |
|---|---|---|---|
| 2004/0054750 A1* | 3/2004 | de Jong et al. | 709/217 |
| 2005/0262540 A1 | 11/2005 | Swix et al. | |
| 2006/0069914 A1* | 3/2006 | Rupp et al. | 713/168 |
| 2006/0085845 A1 | 4/2006 | Davis et al. | |
| 2006/0184989 A1* | 8/2006 | Slothouber | 725/110 |
| 2006/0259965 A1* | 11/2006 | Chen | 726/20 |
| 2007/0083895 A1 | 4/2007 | McCarthy et al. | |
| 2007/0143831 A1 | 6/2007 | Pearson et al. | |

OTHER PUBLICATIONS

Non-Final Office Action for U.S. Appl. No. 11/314,067 received from the United States Patent and Trademark Office (USPTO) mailed Oct. 13, 2010, 29 pages.

Final Office Action for U.S. Appl. No. 11/314,067 received from the United States Patent and Trademark Office (USPTO) mailed Apr. 1, 2011, 38 pages.

Notice of Allowance for U.S. Appl. No. 11/314,067 received from the United States Patent and Trademark Office (USPTO) mailed Apr. 25, 2012, 39 pages.

* cited by examiner

SYSTEM AND METHOD OF AUTHENTICATION

CROSS REFERENCE TO RELATED APPLICATIONS

This application is a continuation of, and claims priority from, U.S. patent application Ser. No. 11/314,067, filed Dec. 21, 2005 and entitled "SYSTEM AND METHOD OF AUTHENTICATION," which is hereby incorporated by reference in its entirety.

FIELD OF THE DISCLOSURE

The present disclosure is generally related to electronic authentication.

BACKGROUND

Subscription services are common. Illustrative electronic subscription services include television services and Internet services. A subscriber can maintain an account with a television service provider, and they can maintain a separate account with an Internet service provider. When an individual subscriber wants to access television content via a set-top box device, for example, the television content provider can verify that an authorized subscription account is associated with the set-top box device before granting access to the television content. Similarly, if an individual subscriber wants to access the Internet via a computing device, the Internet service provider can verify that a subscription account is associated with the user before granting access to the Internet.

Security is a concern with electronic subscription services. Some individuals may desire to take advantage of services without paying required charges, such as by impersonating registered subscribers. Thus, many electronic subscription services require users to enter a password, personal identification number (PIN), or other authentication token associated with a registered subscriber account, prior to allowing access to accounts, information, or content. Individual subscribers may wish to reset authentication tokens that they forget or misplace, but hackers or other individuals may also desire to reset the authentication tokens, in order to steal services. Accordingly, there is a need for an improved system and method of resetting authentication tokens.

DETAILED DESCRIPTION

Figure 1:
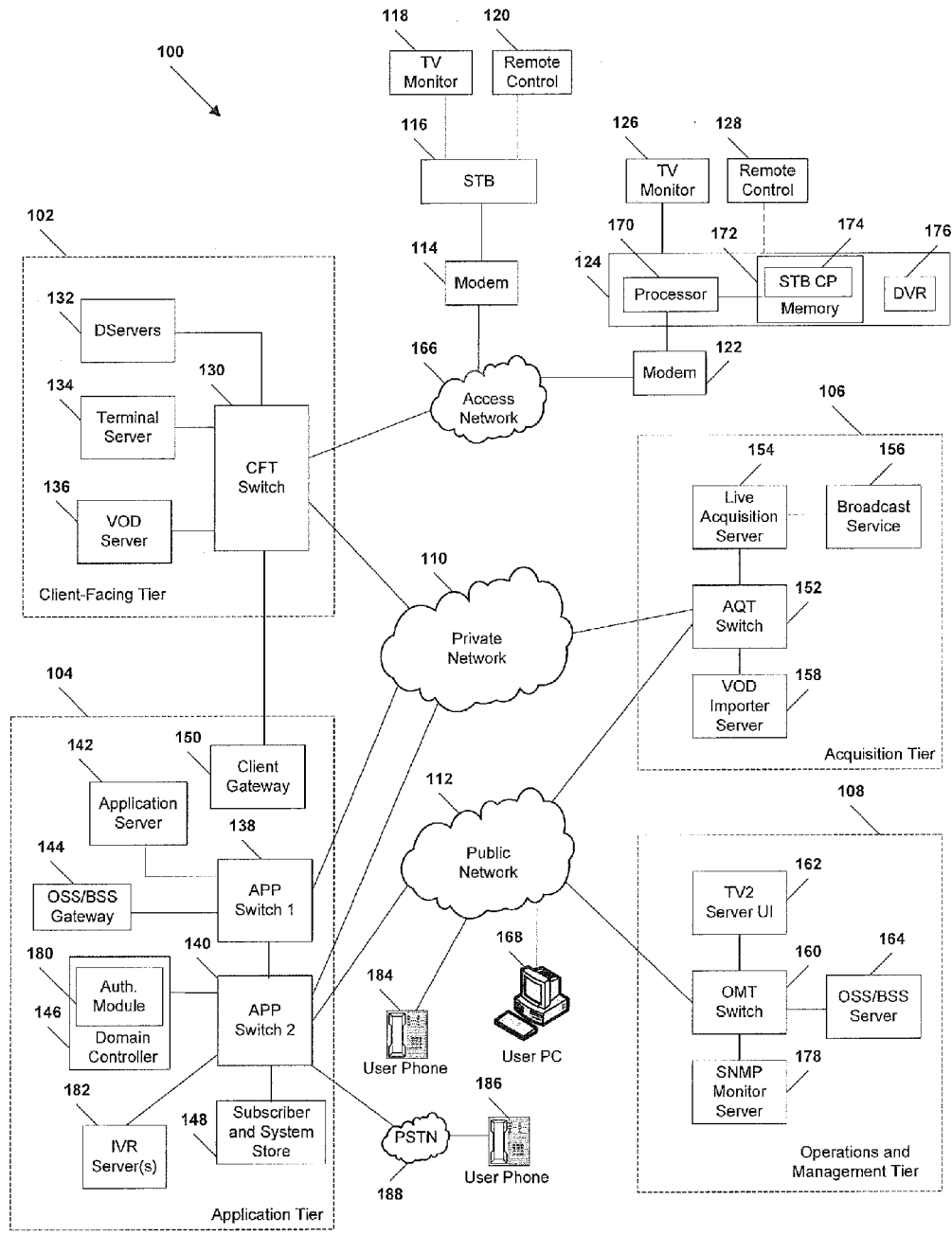
FIG. 1 is a block diagram illustrating an embodiment of an Internet Protocol Television (IPTV) system.

A system and method of authentication is disclosed. In a particular embodiment, the method includes prompting a user of a computing device to transmit a first authentication token associated with an Internet account. The method also includes prompting the user to transmit a second authentication token associated with the Internet account. Further, the method includes receiving the second authentication token via the computing device and transmitting a temporary authentication token to a set-top box device of the user.

In another embodiment, an authentication method is disclosed and includes receiving a temporary authentication token at a set-top box device, where the temporary authentication token is associated with an Internet account of a user.

In another embodiment, an authentication method is disclosed and includes prompting a user to input a first set-top box authentication token. The method also includes prompting the user to input a second set-top box authentication token and receiving the second set-top box authentication token. The method also includes transmitting a command to a server to provide a temporary set-top box authentication token via a second device that is not a set-top box device.

In another embodiment, an authentication method is disclosed and includes receiving a command from a set-top box device to associate a temporary set-top box authentication token with an Internet account and associating the temporary set-top box authentication token with the Internet account.

In another embodiment, an authentication method is disclosed and includes receiving a command from a set-top box device to associate a temporary set-top box authentication token with an identifier of a telephone device and associating the temporary set-top box authentication token with the identifier of a telephone device.

In another embodiment, an authentication system is disclosed and includes a server having a processor and a memory device accessible to the processor. The memory device includes an authentication module that is executable by the processor to prompt for a first authentication token associated with an Internet account. The authentication module is also configured to prompt for a second authentication token associated with the Internet account. The server provides a temporary authentication token to a set-top box device after the second authentication token is received.

In another embodiment, a set-top box device is disclosed and includes a processor and a memory device accessible to the processor. The memory device includes instructions to receive a temporary authentication token associated with an Internet account of a user.

In another embodiment, a computer program embedded in a computer-readable media is disclosed and includes instructions to prompt a user of a computing device to transmit a first authentication token associated with an Internet account. The computer program also includes instructions to prompt the user to transmit a second authentication token. The computer program also includes instructions to issue a command to transmit a temporary authentication token, for use at the computing device, to a set-top box device after the second authentication token is transmitted.

In another embodiment, a computer program embedded in a computer-readable media is disclosed and includes instructions to prompt a user to input a first set-top box authentication token. The computer program also includes instructions to prompt the user to input a second set-top box authentication token. The computer program also includes instructions to transmit a command to associate a temporary set-top box authentication token with an Internet account of the user in response to an input of the second set-top box authentication token.

In another embodiment, a computer program embedded in a computer-readable media is disclosed and includes instructions to prompt a user to input a first set-top box authentication token. The computer program also includes instructions to prompt the user to input a second set-top box authentication token. The computer program also includes instructions to transmit a command to associate a temporary set-top box authentication token with an identifier of a telephone device in response to an input of the second set-top box authentication token.

In another embodiment, a computer program embedded in a computer-readable media is disclosed and includes instructions to communicate with a telephone network to receive a call. The computer program also includes instructions to obtain an identifier of a telephone device from caller identification information received with the call. The computer program also includes instructions to communicate a temporary set-top box authentication token associated with the identifier via the telephone device.

Referring to FIG. 1, an illustrative embodiment of an Internet Protocol Television (IPTV) system that may be used to authenticate users is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

As illustrated in FIG. 1, the client-facing tier 102 can communicate with user equipment via a private access network 166, such as an Internet Protocol Television (IPTV) access network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, a designated market area or any other suitable geographic area, market area, or subscriber or customer group that can be supported by networking the client-facing tier 102 to numerous set-top box devices. In an illustrative embodiment, the client-facing tier, or any portion thereof, can be included at a video head-end office.

In a particular embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device can communicate with a second remote control 128.

In an exemplary, non-limiting embodiment, each set-top box device 116, 124 can receive video content, which may include video and audio portions, from the client-facing tier 102 via the private access network 166. The set-top boxes 116, 124 can transmit the video content to an external display device, such as the television monitors 118, 126. Further, the set-top box devices 116, 124 can each include a STB processor, such as STB processor 170, and a STB memory device, such as STB memory 172, which is accessible to the STB processor 170. In one embodiment, a computer program, such as the STB computer program 174, can be embedded within the STB memory device 172. Each set-top box device 116, 124 can also include a video content storage module, such as a digital video recorder (DVR) 176. In a particular embodiment, the set-top box devices 116, 124 can communicate commands received from the remote control devices 120, 128 to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers, such as D-servers 132, that store, format, encode, replicate, or otherwise manipulate or prepare video content for communication from the IPTV system 100 to the set-top box devices 116, 124. The CFT switch 130 can also be coupled to a terminal server 134 that provides terminal devices with a connection point to the private network 110. In a particular embodiment, the CFT switch 130 can also be coupled to a video-on-demand (VOD) server 136 that stores or provides VOD content imported by the IPTV system 100.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the private access network 166, which enable the set-top box devices 116, 124 to provide functions, such as display, messaging, processing of IPTV data and VOD material, etc. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

Further, the second APP switch 140 can be coupled to a domain controller 146 that provides Internet access, for example, to users via the public network 112. For example, the domain controller 146 can provide remote Internet access to IPTV account information, e-mail, personalized Internet services, or other online services via the public network 112. Users can access such information or services using their personal computers 168. The second APP switch 140 can be coupled to a subscriber and system store 148 that includes account information, such as account information that is associated with users who access the system 100 via the private network 110 or the public network 112. Additionally, the second APP switch 140 can be coupled to one or more interactive voice response (IVR) servers 182 that can communicate with a first user telephone 184, such as a Voice over Internet Protocol (VoIP) phone, via the public network 112, or with a second user telephone 186 via a public switched telephone network 188.

In a particular embodiment, the application tier 104 can also include a client gateway 150 that communicates data directly with the client-facing tier 102. In this embodiment, the client gateway 150 can be coupled directly to the CFT switch 130. The client gateway 150 can provide or restrict access to the private network 110 and the tiers coupled thereto.

In a particular embodiment, the set-top box devices 116, 124 can access the IPTV system 100 via the private access network 166, using information received from the client gateway 150. In this embodiment, the private access network 166 can provide security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when the first representative set-top box device 116 accesses the system 100 via the private access network 166, the client gateway 150 can verify subscriber information by communicating with the subscriber and system store 148 via the private network 110, the first APP switch 138, and the second APP switch 140. Further, the client gateway 150 can verify billing information and status by communicating with the OSS/BSS gateway 144 via the private network 110 and the first APP switch 138. In one embodiment, the OSS/BSS gateway 144 can transmit a query via the first APP switch 138, to the second APP switch 140, and the second APP switch 140 can communicate the query via the public network 112 to the OSS/BSS server 164. After the client gateway 150 confirms subscriber and/or billing information, the client gateway 150 can allow the set-top box device 116 to access IPTV content and VOD content. If the client gateway 150 cannot verify subscriber information for the set-top box device 116, e.g., because it is connected to an unauthorized twisted pair, the client gateway 150 can block transmissions to and from the set-top box device 116 beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television or movie content, for example, from a broadcast service 156. In a particular embodiment, the live acquisition server 154 can transmit the television or movie content to the AQT switch 152, and the AQT switch 152 can transmit the television or movie content to the CFT switch 130 via the private network 110.

Further, the television or movie content can be transmitted to the D-servers 132, where it can be encoded, formatted, stored, replicated, or otherwise manipulated and prepared for communication to the set-top box devices 116, 124. The CFT switch 130 can receive the television or movie content from the D-servers 132 and communicate the content to the modems 114, 122 via the private access network 166. The set-top box devices 116, 124 can receive the television or movie content via the modems 114, 122, and can transmit the television or movie content to the television monitors 118, 126. In an illustrative embodiment, video or audio portions of the television or movie content can be streamed to the set-top box devices 116, 124.

Further, the AQT switch can be coupled to a video-on-demand importer server 158 that stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the private access network 166 to the VOD server 136, via the CFT switch 130. Upon receiving such requests, the VOD server 136 can retrieve the requested VOD content and transmit the content to the set-top box devices 116,124 across the private access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 170 that monitors network devices within or coupled to the IPTV system 100. In a particular embodiment, the OMT switch 160 can communicate with the AQT switch 152 via the public network 112.

In an illustrative embodiment, the live acquisition server 154 can transmit the television or movie content to the AQT switch 152, and the AQT switch 152, in turn, can transmit the television or movie content to the OMT switch 160 via the public network 112. In this embodiment, the OMT switch 160 can transmit the television or movie content to the TV2 server 162 for display to users accessing the user interface at the TV2 server 162. For example, a user can access the TV2 server 162 using a personal computer (PC) 168 coupled to the public network 112.

In a particular embodiment, a user can attempt to access online services provided via the domain controller 146 by using a personal computer 168 or other computing device to access an account. For example, the user can activate an Internet browser and navigate to an access web page provided by the domain controller 146. In one embodiment, the domain controller 146 can include an authentication module 180 that is configured to prompt the user to transmit a primary authentication token that is stored and associated with the user's account information at the subscriber and system store 148. If the user enters the primary authentication token, the authentication module 180 can be configured to grant the user access to his or her Internet account, IPTV account, or other online information or services provided to subscribers via the domain controller 146. On the other hand, if the user does not enter the primary authentication token, the authentication module 180 can be configured to deny the user access to such accounts, information or services.

In an illustrative embodiment, the authentication module 180 can be configured to prompt the user to transmit a secondary authentication token, if the user does not transmit the primary authentication token, e.g., if the user has forgotten or misplaced the primary authentication token required to access his or her Internet account, IPTV account, or other online information or services provided to subscribers via the domain controller 146. For instance, the user can be prompted to input an answer to a security question, such as "What is your pet's name?" or "What is your mother's maiden name?" The security question and answer can be designated by the user when setting up an account and can be stored and associated with the user's account information at the subscriber and system store 148. If the user enters a correct answer or other secondary authentication token, the authentication module 180 can be configured to provide a temporary authentication token via a secure means, such as via e-mail, telephone, set-top box device, or postal service.

In a particular embodiment, the subscriber and system store 148 can associate the user's Internet account or IPTV account with the user's set-top box device, such as the second representative set-top box device 124. If a user provides a correct answer or other secondary authentication token, the subscriber and system store 148 can provide a temporary authentication token, such as a temporary password, to the user's set-top box device 124 via the IPTV system 100. For example, the subscriber and system store 148 can generate a temporary authentication token and associate it with the user's account as a primary authentication token. The subscriber and system store 148 can communicate the temporary authentication token via the second APP switch 140 to the CFT switch 130 via the private network 110. The CFT switch 130 can communicate the temporary authentication token to the user's set-top box device 124 via the access network 166. Further, the set-top box device 124 can transmit the temporary authentication token to the television monitor 126.

Upon retrieving the temporary authentication token via the television monitor 126, the user can use the personal computer 168 to enter it at the access web page as the primary authentication token. The authentication module 180 can be configured to grant the user access to the accounts or other information or services provided via the domain controller 146. In a particular embodiment, the authentication module 180 can be configured to prompt the user to reset the primary authentication token upon accessing his or her account. The user can change the primary authentication token from the temporary authentication token to the prior primary authentication token or to a different primary authentication token. The primary authentication token can then be stored and associated with the user's account information at the subscriber and system store 148.

In an illustrative embodiment, each of the first authentication token, the second authentication token, and the temporary authentication token, can be a password, a personal identification number (PIN), a pass key, a pass code, a biometric input, a one-time access key, an answer to a security question, any other suitable authentication token, or a combination thereof In another particular embodiment, a user can attempt to access the IPTV network via a set-top box device, such as the first representative set-top box device 116. For example, the user can be prompted to use a remote control 120 or a keypad on the set-top box device 116 to enter a STB password, STB PIN, or other primary STB authentication token that is stored and associated with the set-top box device 116 at the subscriber and system store 148. If the user enters a correct STB password, STB PIN, or other primary STB authentication token, the client gateway 150 can grant access to the IPTV system 100. Otherwise, the client gateway 150 can prevent access to the IPTV system 100.

In an illustrative embodiment, if the user has forgotten the STB password, STB PIN, or other primary STB authentication token required to access the IPTV system 100, the user can be prompted to enter a secondary STB authentication token that is stored and associated with the user's account information at the subscriber and system store 148. If a user provides the secondary STB authentication token, the set-top box device 116 can provide a temporary STB authentication token, such as a temporary STB password, to the user's personal computer 168 or other computing device via the user's Internet account. For example, the set-top box device 116 can generate a temporary STB authentication token and issue a command to a server, such as the subscriber and system store 148 to associate temporary STB authentication token with the user's Internet account. The subscriber and system store 148 can communicate the temporary STB authentication token via the second APP switch 140 to the personal computer 168 via the public network 110.

Upon retrieving the temporary STB authentication token via the personal computer 168, the user can enter it at the set-top box device 116 as the primary STB authentication token and access the IPTV system 100. In a particular embodiment, the user can be prompted to reset the STB password, STB PIN, or other primary STB authentication token upon accessing the IPTV system 100. The user can change the STB password; STB PIN, or other primary STB authentication token from the temporary authentication token to the prior STB password, STB PIN, or other primary STB authentication token or to a different STB password, STB PIN, or other STB primary authentication token. The STB password, STB PIN, or other STB primary authentication token can then be stored at the set-top box device 116.

In another particular embodiment, if a user provides the secondary STB authentication token, the set-top box device 116 can provide a temporary STB authentication token, such as a temporary STB password, to the user phone 184 via the public network 112. For example, the set-top box device 116 can generate a temporary STB authentication token and issue a command to a server, such as the IVR server 182, to associate the temporary STB authentication token with an identifier of the user phone 184. The IVR server 184 can receive a call from the user phone 184 and obtain the identifier from caller identification information received with the call. The IVR server 184 can communicate the temporary STB authentication token via the second APP switch 140 to the user phone 184 via the public network 112.

Upon retrieving the temporary STB authentication token via the user phone 184, the user can enter it at the set-top box device 116 as the primary STB authentication token and access the IPTV system 100. In a particular embodiment, the user can be prompted to reset the STB password, STB PIN, or other primary STB authentication token upon accessing the IPTV system 100. The user can change the STB password, STB PIN, or other primary STB authentication token from the temporary authentication token to the prior STB password, STB PIN, or other primary STB authentication token or to a different STB password, STB PIN, or other STB primary authentication token. The STB password, STB PIN, or other STB primary authentication token can then be stored at the set-top box device 116.

Figure 2:
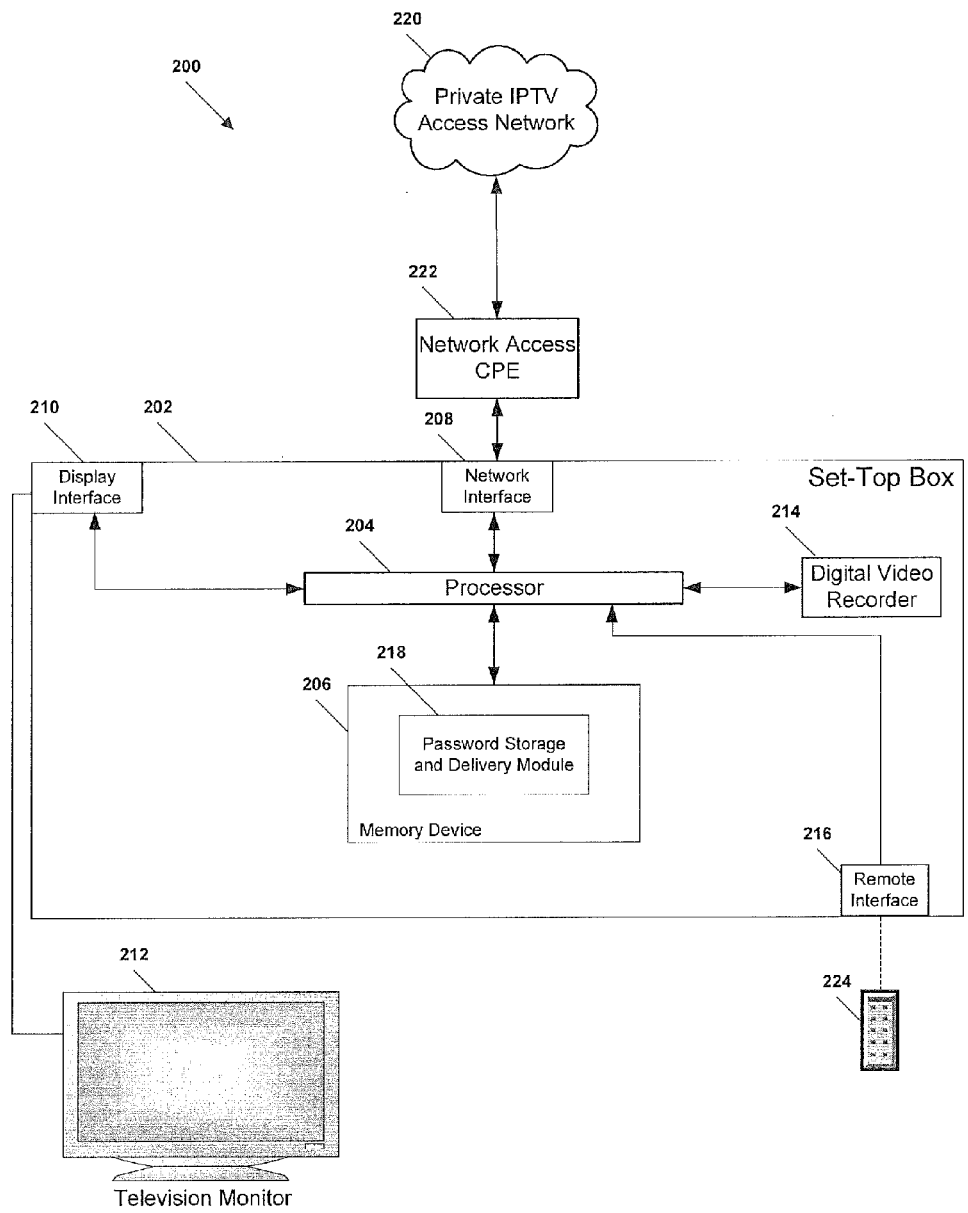
FIG. 2 is a block diagram illustrating an embodiment of an authentication system.

Referring to FIG. 2, an embodiment of an authentication system is illustrated and designated generally at 200. The system includes a set-top box 202 that contains a processor 204 and a memory device 206 that is accessible to the processor 204. Additionally, the processor 204 is coupled to a network interface 208. Further, the processor 204 can be coupled to a display interface 210, such as a television interface, through which the set-top box device 202 can communicate video content to an external display device, such as a television monitor 212. In addition, the processor 204 can communicate with a remote control device 224, via a remote control interface 216.

The processor 204 can communicate with an external access network, such as a private Internet Protocol Television (IPTV) access network 220, via the network interface 208. In an illustrative, non-limiting embodiment, the private IPTV access network 220 can be the private access network 120 illustrated in FIG. 1. In a particular embodiment, network access customer premises equipment (CPE) 222 can facilitate communication between the network interface 208 and the private IPTV access network 220. The network access CPE 222 can include a router, a local area network device, a modem, such as a digital subscriber line (DSL) modem, any other suitable device for facilitating communication between the network interface 208 of the set-top box device 202 and the private IPTV access network 220, or any combination thereof. In an illustrative, non-limiting embodiment, the network access CPE 222 can be the modem 122 illustrated in FIG. 1.

In a particular embodiment, the memory device 206 can include a password storage and delivery module 218. The password storage and delivery module 218 can be configured to receive a temporary authentication token associated with an Internet account of a user via the private IPTV access network 220. The processor 204 can be configured to transmit the temporary authentication token to the display interface 210, via the display interface 210, when a user requests the temporary authentication token. In an illustrative embodiment, the processor 204 can be configured to prompt the user for a set-top box (STB) authentication token before transmitting the temporary authentication token to the television monitor 212. The processor 204 can determine whether the user enters the STB authentication token, for example, by comparing the user input to the STB authentication token stored in the password storage and delivery module 218.

In another embodiment, the processor 204 can be configured to transmit a prompt to a user at the television monitor 212 to input a first set-top box (STB) authentication token, for example, via the remote control 224. The processor 204 can determine whether the user enters the STB authentication token, for example, by comparing the user input to the STB authentication token stored in the password storage and delivery module 218. Additionally, the processor 204 can be configured to access the private IPTV access network 220 when the first STB authentication token is received and to not access the private IPTV access network 220 when the first STB authentication token is not received.

In an illustrative embodiment, the processor 204 can be configured to transmit a prompt to the user at the television monitor 212 to input a second STB authentication token stored by the password storage and delivery module 218, when the first STB authentication token is not received. Further, the processor 204 can be configured to generate a temporary STB authentication token, using instructions stored in the password storage and delivery module 218, when the second STB authentication token is received. In addition, the processor 204 can reset the first STB authentication token to the temporary STB authentication token. Moreover, the processor 204 can be configured to transmit a command via the private IPTV access network 220 to an authentication server or other device within the IPTV system to associate the temporary STB authentication token with the user's Internet account. In an illustrative embodiment, the authentication server or other device can transmit the temporary STB authentication token to a user computing device. In addition, the processor 204 can be configured to access the IPTV system when the temporary STB authentication token is received at the set-top box device 202. In a particular embodiment, the processor 204 can be configured to issue a prompt to the user at the television monitor 212 to reset the first STB authentication token to the prior first STB authentication token or to a different first STB authentication token, when the temporary STB authentication token is received.

In an illustrative embodiment, each of the first STB authentication token, the second STB authentication token, and the temporary STB authentication token, may be a password, a personal identification number (PIN), a pass key, a pass code, a biometric input, a one-time access key, an answer to a security question, any other suitable authentication token, or a combination thereof.

Figure 3:
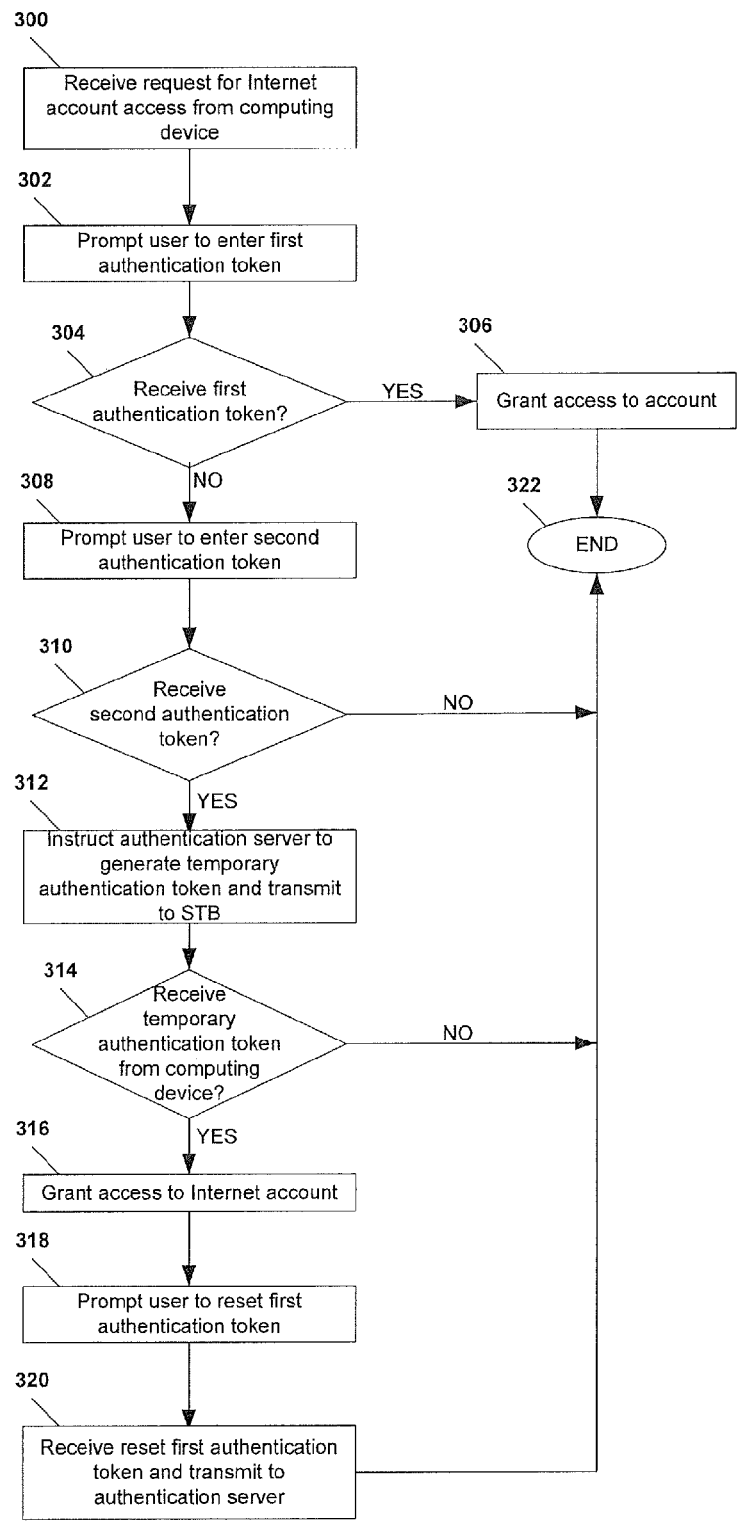
FIG. 3 is a flow diagram illustrating an embodiment of an authentication method.

Referring to FIG. 3, a particular illustrative embodiment of an authentication method is disclosed. At block 300, a server receives a request to access an Internet account. In a particular embodiment, the request can be received from a user computing device at an Internet server within an Internet Protocol Television (IPTV) system. Moving to block 302, the server can transmit a prompt to the user via a computing device to input a first authentication token associated with the Internet account, such as a password. Continuing to decision step 304, the server can determine whether it has received the first authentication token from the user computing device. If the server receives the first authentication token from the user computing device, the method proceeds to block 306, and the server can grant the user access to the Internet account or issue a command to another server to grant the user access to the Internet account. The method then terminates at 322. Conversely, if the server does not receive the first authentication token from the user computing device, the method proceeds to block 308.

At block 308, the server transmits a prompt to the user via the computing device to enter a second authentication token, such as an answer to a security question. Continuing to decision step 310, the server determines whether it has received the second authentication token. If the server does not receive the second authentication token, the method terminates at 322. On the other hand, if the server receives the second authentication token, the method moves to block 312. In a particular embodiment, at block 312, the server can issue a command or instruction to another server within the IPTV system, such as an authentication server, to generate a temporary authentication token. The temporary authentication token can be generated randomly or based on one or more variables or factors, such as a time at which the temporary authentication token is generated.

In an illustrative embodiment, the authentication server can reset the first authentication token to the temporary authentication token (such as a one-time use or limited-time use authentication token) and transmit the temporary authentication token to a user set-top box device associated with the user of the Internet account via an IPTV access network. Advancing to block 314, the server can determine whether it has received the temporary authentication token from the user computing device. If the server does not receive the temporary authentication token, the method terminates at 322. Alternatively, if the server receives the temporary authentication token, the method proceeds to block 316, and the server grants access to the Internet account.

Moving to block 318, in a particular embodiment, the server transmits a prompt to the user at the computing device to reset the first authentication token to an authentication token other than the temporary authentication token. Using the computing device, the user can reset the first authentication token from the temporary authentication token to the prior first authentication token, i.e., the one that was forgotten or misplaced, or to a new first authentication token. In a particular embodiment, at block 320, the server receives the authentication token to which the first authentication token is to be reset and transmits it to the authentication server, where it can be stored and associated with the user of the Internet account. The method terminates, at 322.

Figure 4:
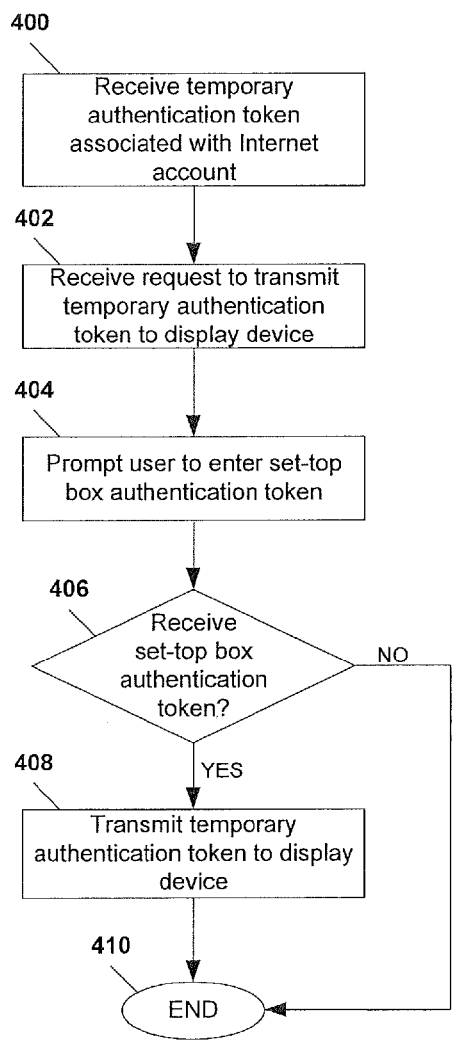
FIG. 4 is a flow diagram illustrating a second embodiment of an authentication method.

Referring to FIG. 4, a second illustrative embodiment of an authentication method is illustrated. In this particular illustrative embodiment, at block 400, a temporary authentication token associated with an Internet account is received at a set-top box device from an Internet Protocol Television (IPTV) system. The temporary authentication token can be generated by a server within the IPTV system, for example, when a user is attempting to access the Internet account via a computing device and forgets or misplaces a primary authentication token associated with the Internet account. The server can transmit the temporary authentication token to the set-top box device after it receives a secondary authentication token, such as an answer to a security question.

Moving to block 402, the set-top box device can receive a request to transmit the temporary authentication token associated with the Internet account to a display device coupled to the set-top box device. For example, a user can issue a command to the set-top box device via a remote control to transmit the temporary authentication token to the display device. Continuing to block 404, in an illustrative embodiment, the set-top box device can transmit a prompt to the user via the display device to input a set-top box authentication token, such as a set-top box password, that is used to grant or restrict access to the set-top box device.

Proceeding to decision step 406, in a particular embodiment, the set-top box device can determine whether it has received the set-top box authentication token. If the set-top box device does not receive the set-top box authentication token, the method terminates at 410. On the other hand, if the set-top box device receives the set-top box authentication token, the method moves to block 408, and the set-top box device transmits the temporary authentication token that it has received from the IPTV system to the display device. In one embodiment, the user can use a computing device to transmit the temporary authentication token to a server within the IPTV system, in order to gain access to the Internet account. The method terminates, at 410.

Figure 5:
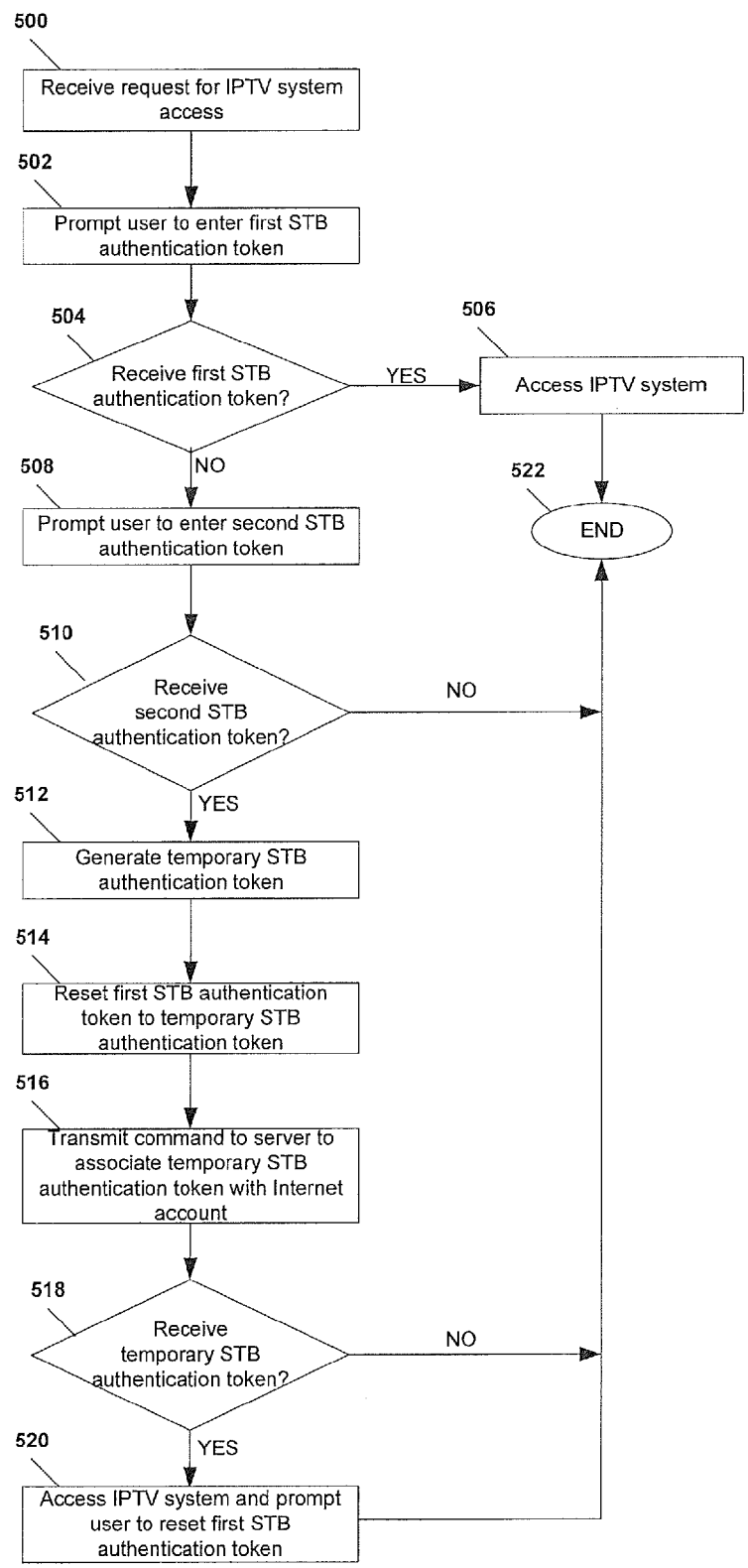
FIG. 5 is a flow diagram illustrating a third embodiment of an authentication method.

Referring to FIG. 5, a third illustrative embodiment of an authentication method is illustrated. At block 500, a set-top box device receives a request to access television content, or other content, from an Internet Protocol Television (IPTV) system. In a particular embodiment, the request can be received via a remote control that communicates with the set-top box device. Moving to block 502, the set-top box device can transmit a prompt to the user via a display device, such as a television monitor coupled to the set-top box device, to input a first set-top box (STB) authentication token, such as a STB password, that the set-top box device uses to grant and restrict use of the set-top box device to access the IPTV system or content provided thereby.

Continuing to decision step 504, the set-top box device can determine whether it has received the first STB authentication token from the user. If the set-top box device receives the first STB authentication token from the user, via the remote control or a keypad on the set-top box device, for example, the method proceeds to block 506, and the set-top box allows the user to access the IPTV system and content provided by the IPTV system. The method then terminates at 522. Conversely, if the server does not receive the first STB authentication token from the user, the method proceeds to block 508.

At block 508, the set-top box device transmits a prompt to the user via the display device to enter a second STB authentication token, such as an answer to a security question. Continuing to decision step 510, the set-top box device determines whether it has received the second STB authentication token. If the set-top box device does not receive the second STB authentication token, the method terminates at 522. On the other hand, if the set-top box device receives the second STB authentication token, the method moves to block 512. In a particular embodiment, at block 512, the set-top box device can generate a temporary STB authentication token. The temporary STB authentication token can be generated randomly or based on one or more variables or factors, such as a time at which the temporary STB authentication token is generated.

In an illustrative embodiment, at block 514, the set-top box device can reset the first STB authentication token to the temporary STB authentication token, such that the user can use the set-top box device to access the IPTV system and content provided by the IPTV system, by inputting the temporary STB authentication token at the set-top box device. The set-top box device can increase the security of the temporary STB authentication token by providing it at an electronic device other than the set-top box device itself.

Proceeding to block 516, the set-top box device transmits a command to a server within the IPTV system to associate the temporary STB authentication token with an Internet account of the user. The user can use a computing device to access the Internet account, and the server can transmit the temporary STB authentication token to the computing device. Because it is less likely that an unauthorized party will have access to a computing device or Internet account authentication token associated with an authorized user of a set-top box device, providing the temporary STB authentication token via the Internet account is more secure than providing it at the set-top box device itself. The user can then enter the temporary STB authentication token at the set-top box device, via remote control or keypad, for example, in order to use the set-top box device to access the IPTV system and television or other content provided by the IPTV system.

Advancing to decision step 518, the set-top box device can determine whether it has received the temporary STB authentication token from the user. If the set-top box device does not receive the temporary STB authentication token, the method terminates at 522. Alternatively, if the set-top box device receives the temporary STB authentication token, the method proceeds to block 520, and the set-top box device can allow the user to access the IPTV system and content provided thereby, via the set-top box device. Additionally, the set-top box device can transmit a prompt to the user via the display device to reset the first STB authentication token from the temporary STB authentication token to the authentication token that was forgotten or to a different authentication token. The method terminates, at 522.

Figure 6:
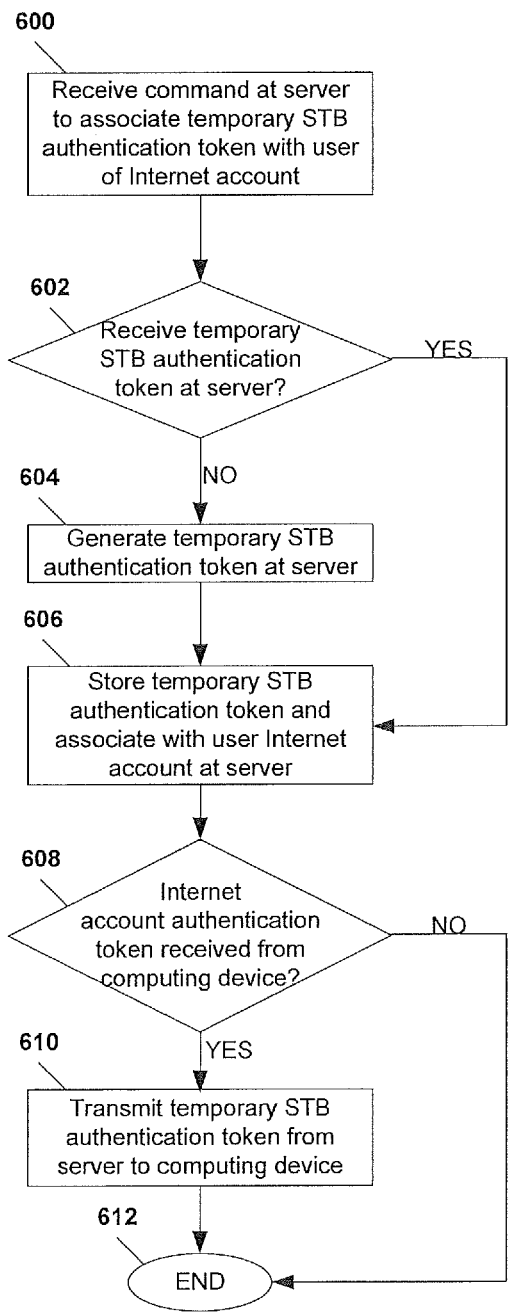
FIG. 6 is a flow diagram illustrating a fourth embodiment of an authentication method.

Referring to FIG. 6, a fourth embodiment of an authentication method is illustrated. In a particular embodiment, at block 600, a command to associate a temporary set-top box (SIB) authentication token with a user of an Internet account is received at an authentication server within an Internet Protocol Television (IPTV) system. In one embodiment, a set-top box device can issue the command to the authentication server, for example, when a user is attempting to use the set-top box device to access the IPTV system and forgets or misplaces a primary STB authentication token that the set-top box devices uses to grant or restrict access to the IPTV system or content provided thereby. The set-top box device can issue the command after it receives a secondary STB authentication token, such as an answer to a security question.

Moving to block 602, the authentication server can determine whether it has received a temporary STB authentication token from the set-top box device along with the command. If the authentication server has received the temporary STB authentication token from the set-top box device, e.g., if the set-top box device generates the temporary STB authentication token, the method proceeds to block 606 and continues as described. Conversely, if the authentication server has not received the temporary STB authentication token from the set-top box device, the method advances to block 604, and the authentication server generates the temporary STB authentication token. The method then continues to block 606.

At block 606, the authentication server stores the temporary STB authentication token and associates it with the user of the Internet account. In a particular embodiment, the user can retrieve the temporary STB authentication token from the authentication server by using a computing device to access the Internet account. Moving to decision step 608, in an illustrative embodiment, the authentication server can determine whether an Internet account authentication token has been received from a computing device that communicates with the authentication server, for example, via an Internet portal provided by a domain controller within the IPTV system. If the Internet account authentication token is not received at the authentication server, the method terminates at 612. On the other hand, if the Internet account authentication token is received at the authentication server, the method continues to block 610, and the authentication server transmits the temporary STB authentication token to the computing device. The user may then input the temporary STB authentication token at the set-top box device that issued the command to the authentication server. The method terminates, at 612.

Figure 7:
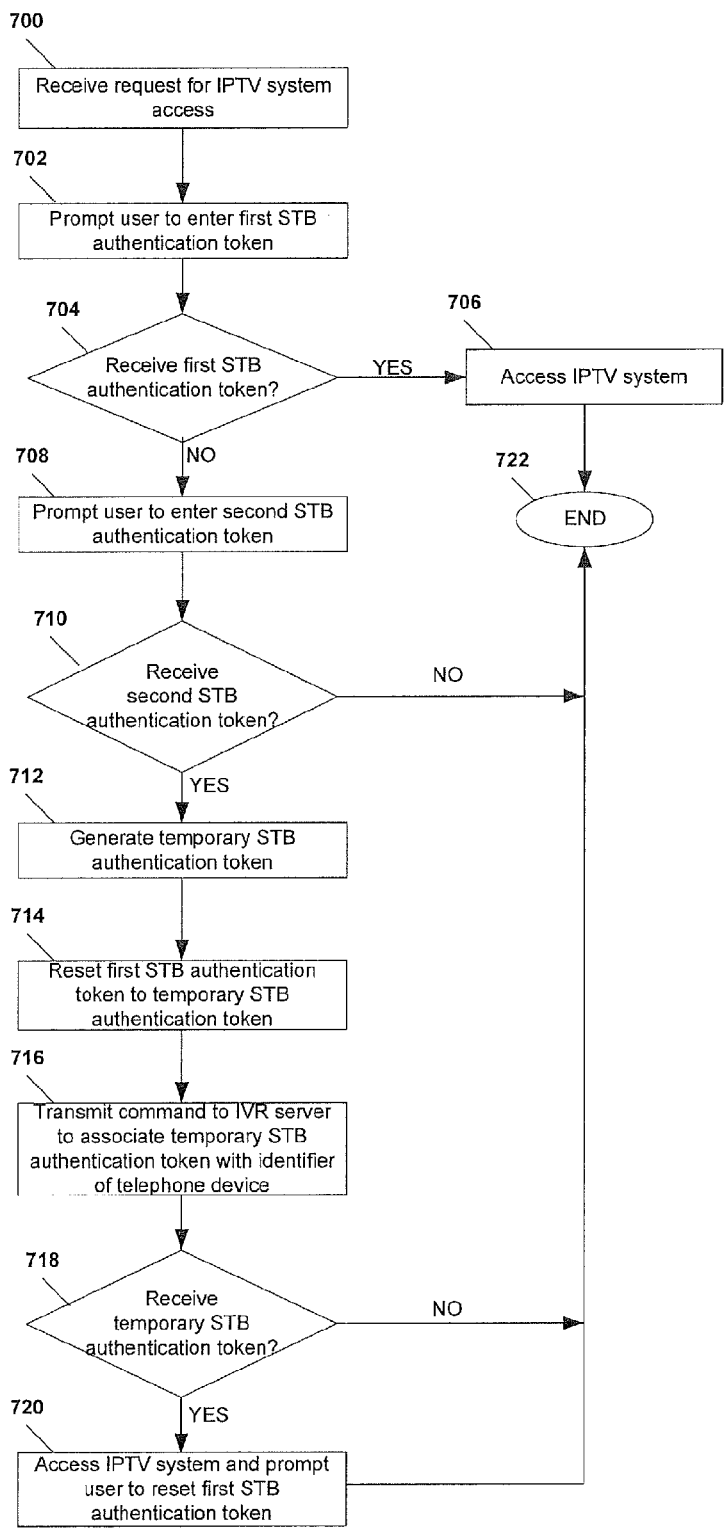
FIG. 7 is a flow diagram illustrating a fifth embodiment of an authentication method.

Referring to FIG. 7, a fifth illustrative embodiment of an authentication method is illustrated. At block 700, a set-top box device receives a request to use the set-top box device to access an Internet Protocol Television (IPTV) system and television or other content provided by the IPTV system. In a particular embodiment, the request can be received via a remote control that communicates with the set-top box device. Moving to block 702, the set-top box device can transmit a prompt to the user via a display device, such as a television monitor coupled to the set-top box device, to input a first set-top box (STB) authentication token, such as a STB password.

Continuing to decision step 704, the set-top box device can determine whether it has received the first STB authentication token from the user. If the set-top box device receives the first STB authentication token from the user, the method proceeds to block 706, and the set-top box device allows the user to access the IPTV system and television or other content provided by the IPTV system. The method then terminates at 722. Conversely, if the set-top box device does not receive the first STB authentication token from the user, the method proceeds to block 708. For instance, the user may forget or misplace the first STB authentication token and input an incorrect authentication token or no authentication token.

At block 708, the set-top box device transmits a prompt to the user via the display device to enter a second STB authentication token, such as an answer to a security question. In a particular embodiment, the set-top box device can transmit the prompt in response to an incorrect authentication token input by the user. In another embodiment, the set-top box device can transmit the prompt in response to a user indication that the first STB authentication token has been forgotten.

Continuing to decision step 710, the set-top box device determines whether it has received the second STB authentication token. If the set-top box device does not receive the second STB authentication token, the method terminates at 722. On the other hand, if the set-top box device receives the second STB authentication token, the method moves to block 712. In a particular embodiment, at block 712, the set-top box device can generate a temporary STB authentication token. The temporary STB authentication token can be generated randomly or based on one or more variables or factors, such as a time at which the temporary authentication token is generated.

In an illustrative embodiment, at block 714, the set-top box device can reset the first STB authentication token to the temporary STB authentication token, such that the user can use the set-top box device to access the IPTV system and content provided by the IPTV system, by inputting the temporary STB authentication token at the set-top box device. The set-top box device can increase the security of the temporary STB authentication token by providing it at an electronic device other than the set-top box device itself.

Proceeding to block 716, the set-top box device transmits a command to a server within the IPTV system, such as an interactive voice response (IVR) server to associate the temporary STB authentication token with an identifier of a telephone device. In a particular embodiment, the user can call a telephone number associated with the IVR server. The IVR server can communicate the temporary STB authentication token to the user via the telephone device, after verifying that the identifier of the telephone device is included in caller identification information received with the call. Because it is less likely that an unauthorized party will have access to a telephone device associated with an authorized user of a set-top box device, providing the temporary STB authentication token by telephone is more secure than providing it at the set-top box device itself. The user can enter the temporary STB authentication token at the set-top box device, via remote control or keypad, for example, in order to use the set-top box device to access the IPTV system and television or other content provided by the IPTV system.

Advancing to decision step 718, the set-top box device can determine whether it has received the temporary STB authentication token from the user. If the set-top box device has not received the temporary STB authentication token, the method terminates at 722. Alternatively, if the set-top box device receives the temporary STB authentication token, the method proceeds to block 720, and the set-top box device can allow the user to access the IPTV system or content provided by the IPTV system. Additionally, the set-top box device transmits a prompt to the user at the display device to reset the first STB authentication token, from the temporary STB authentication token to the authentication token that was forgotten or to a different authentication token. The method terminates, at 722.

Figure 8:
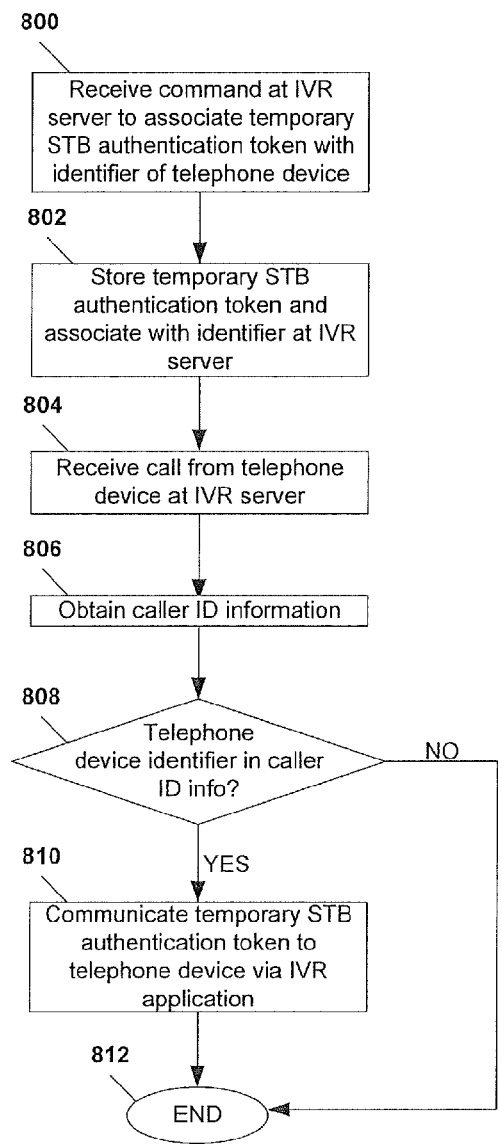
FIG. 8 is a flow diagram illustrating a sixth embodiment of an authentication method.

Referring to FIG. 8, a sixth illustrative embodiment of an authentication method is illustrated. In a particular embodiment, at block 800, a command to associate a temporary STB authentication token with an identifier of a telephone device is received at an interactive voice response (IVR) server within an Internet Protocol Television (IPTV) system. In one embodiment, a set-top box device can issue the command to the IVR server, for example, when a user is attempting to use the set-top box device to access the IPTV system and forgets or misplaces a primary STB authentication token that the set-top box devices uses to grant or restrict access to the IPTV system or content provided thereby. The set-top box device can issue the command after it receives a secondary STB authentication token, such as an answer to a security question.

Moving to block 802, the IVR server stores the temporary STB authentication token and associates it with the identifier of the telephone device. In a particular embodiment, the user can retrieve the temporary STB authentication token from the IVR server by using a telephone device having the identifier with which the temporary STB authentication device is associated. For example, the user can call a telephone number, such as a 1-800 number, associated with the IVR server and navigate through an IVR application to retrieve the temporary STB authentication token.

Proceeding to block 804, the IVR server receives a call from a telephone device. In one embodiment, the IVR server can operate an IVR application that provides a greeting to the caller and menu options or other prompts that allow the caller to indicate that he or she desires to retrieve a temporary STB authentication token. Moving to decision step 806, in an illustrative embodiment, the IVR server obtains caller identification (caller ID) information that is received with the call. For instance, a telephone service provider can provide the IVR server with Automatic Number Identification (ANI), whereby the server receives digital tone multi frequency (DTMF) tones along with the call.

Continuing to decision step 808, in a particular embodiment, the IVR server can determine whether the identifier of the telephone device is included in the caller ID information. If the identifier of the telephone device is not included in the caller ID information, the method terminates at 812. Conversely, if the identifier of the telephone device is included in the caller ID information, the method advances to block 810 and the IVR server communicates the temporary STB authentication token to the telephone device via the IVR application. For example, if the caller indicates a desire to retrieve a temporary STB authentication token, the IVR application can verify an identifier of the telephone device, such as a telephone number, and can retrieve any temporary STB authentication tokens that are associated with the identifier. In an illustrative embodiment, the IVR application can convert the temporary STB authentication token from text or data to audible tones and communicate the temporary STB authentication token to the caller at the telephone device. The method then terminates, at 812.

Though the aspects of the disclosed methods have been presented in a certain order, for ease of description, certain portions of the method may be performed in a different order or simultaneously.

In conjunction with the configuration of structure described herein, the system and method disclosed provide a user with an ability to reset forgotten or misplaced passwords or other authentication tokens via a secure second platform, using multifactor authentication. In a particular embodiment, when a user wishes to reset an authentication token, the user performs at least two actions. The user provides a second authentication token, such as an answer to a security question, and the user retrieves a temporary authentication token from a second secure platform.

For example, if the user has forgotten or misplaced a first authentication token associated with an Internet account, the user provides a second authentication token via a computing device. A temporary authentication token is transmitted to a set-top box device associated with the user of the Internet account, and the user can retrieve the temporary authentication token from a display device coupled to the set-top box device. The user can input the temporary authentication token via the computing device to access the associated Internet account, and the user can reset the first authentication token from the temporary authentication token to the forgotten first authentication token or to a new first authentication token.

In another embodiment, a user may forget or misplace a first set-top box (STB) authentication token that is used to grant or restrict access to an Internet Protocol Television (IPTV) system or content provided by the IPTV system. The user inputs a second STB authentication token at the set-top box device. A temporary STB authentication token is transmitted to a server within the IPTV system and is associated with the user of the set-top box device. The user can retrieve the temporary STB authentication token from the server using a computing device that may access the server via an Internet account. The user can input the temporary STB authentication token at the set-top box device to access the IPTV system or content provided by the IPTV system.

Multifactor authentication allows users to reset their passwords without having to speak to customer service representatives and provide sensitive information, such as their mother's maiden name, social security numbers, or birth dates. However, processes for resetting passwords that are based in one platform, such as purely Internet-based processes, lend themselves to hacking. For example, spy-ware embedded on a user computing device can capture information related to security questions or other authentication information. Combining the use of multifactor authentication with providing temporary authentication tokens at second secure platforms increases the likelihood that the user is the one attempting to reset the authentication token. Hackers are less likely to have access to both a second authentication token and the second secure platform.

Figure 9:
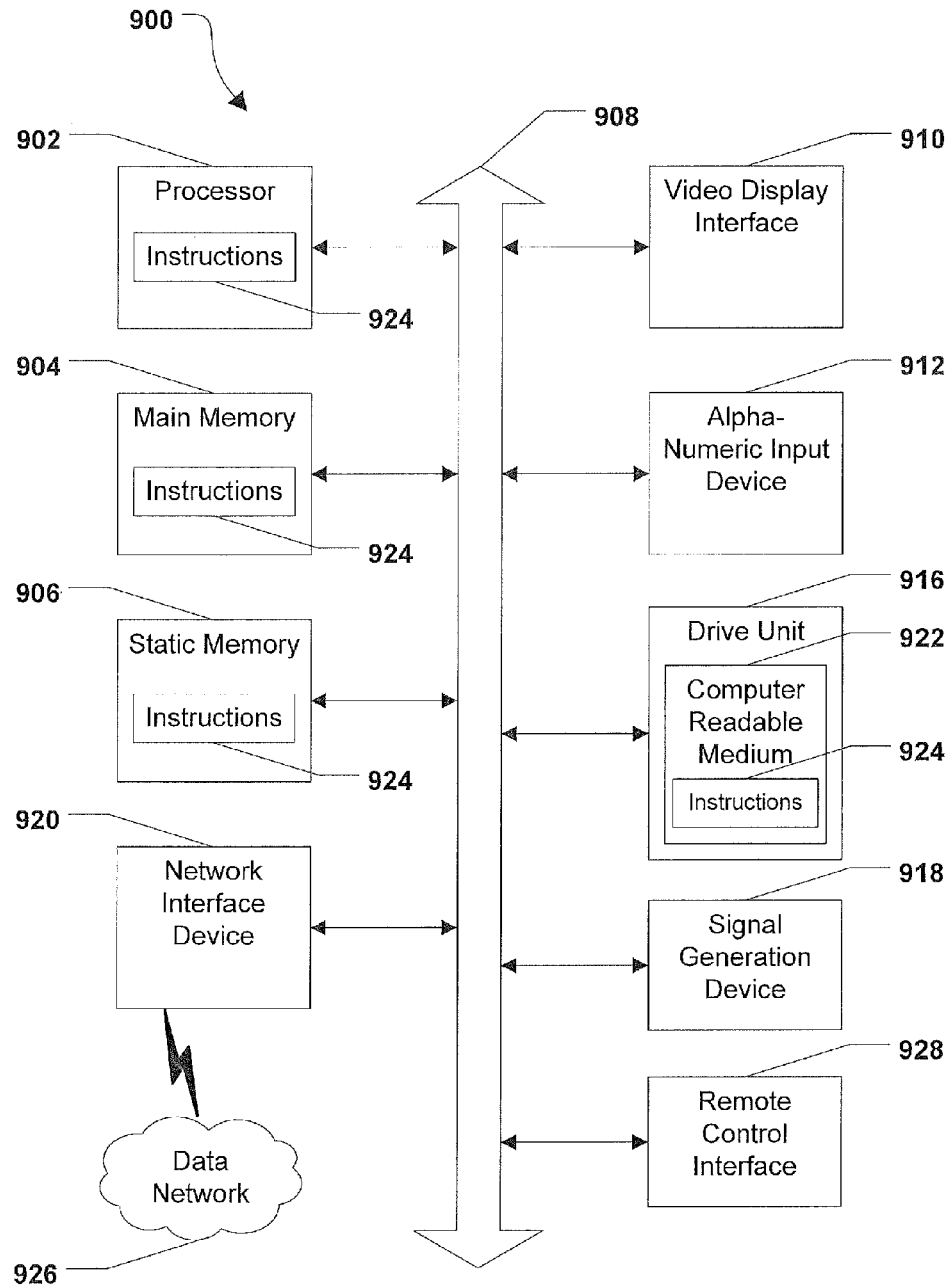
FIG. 9 is a diagram of an illustrative embodiment of a general computer system.

Referring to FIG. 9, an illustrative embodiment of a general computer system is shown and is designated 900. The computer system 900 can include a set of instructions that can be executed to cause the computer system 900, or a portion thereof, to perform any one or more of the methods or computer based functions disclosed herein in connection with the set-top box device or with a network device. The computer system 900, or any portion thereof, may operate as a standalone device or may be a hardware or software module within a server or set-top box device, as illustrated in FIGS. 1 and 2.

In a networked deployment, the computer system may operate in the capacity of server within an IPTV system or a set-top box device communicating therewith. The computer system 900 can also be implemented as or incorporated into various other devices, or any other machine capable of executing a set of instructions (sequential or otherwise) that specify actions to be taken by that machine. In a particular embodiment, the computer system 900 can be implemented using electronic devices that provide audio, video or data communication. Further, while a single computer system 900 is illustrated, the term "system" shall also be taken to include any collection of systems or sub-systems that individually or jointly execute a set, or multiple sets, of instructions to perform one or more computer functions, such as the IPTV system illustrated in FIG. 1.

As illustrated in FIG. 9, the computer system 900 may include a processor 902, e.g., a central processing unit (CPU), a graphics-processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a remote control input, an input control panel, a keyboard, a mouse, a gaming station input, or one or more keys disposed on a set-top box device. The computer system 900 can also include a disk drive unit 916, a signal generation device 918, such as a speaker, and a network interface device 920.

In an illustrative embodiment, the computer system 900 can include a remote control interface 928, such as the remote control interface 216 of the set-top box device illustrated in FIG. 2. The remote control interface 928 can receive inputs from a remote control device.

In a particular embodiment, as depicted in FIG. 9, the disk drive unit 916 may include a computer-readable medium 922 in which one or more sets of instructions 924, e.g., software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives instructions 924 responsive to a propagated signal, so that a device connected to a network 926 can communicate audio, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the claims below. Thus, to the maximum extent allowed by law, the scope of the claims is to be determined by the broadest permissible interpretation of the following claims and their equivalents, and shall not be restricted or limited by the foregoing detailed description.

What is claimed is:

1. A method comprising:
    receiving, at a media playback device from a server, a temporary authentication token that enables access to an account accessible by a first device, wherein the temporary authentication token is generated after validation by the server of a particular authentication token received at the server from the first device, wherein the first device is distinct from the media playback device, and wherein the temporary authentication token is received from the server via a communication path that does not include the first device;
    initiating a prompt to input a media playback device authentication token;
    generating a second temporary authentication token at the media playback device in response to a determination that the media playback device authentication token received at the media playback device is invalid or in response to a request received at the media playback device, the request associated with the second temporary authentication token, wherein the second temporary authentication token enables access to an interactive television system via the media playback device;
    transmitting the second temporary authentication token to the server; and
    initiating, at the media playback device, presentation of the temporary authentication token in response to a determination that the media playback device received the second temporary authentication token.

2. The method of claim 1, further comprising receiving the media playback device authentication token at the media playback device, wherein the presentation of the temporary authentication token is initiated after the media playback device authentication token is received.

3. The method of claim 1, wherein the temporary authentication token is received from the server via a private access network associated with the interactive television system.

4. The method of claim 3, wherein the private access network couples the media playback device to the interactive television system.

5. The method of claim 1, further comprising receiving a request for the temporary authentication token at the media playback device, wherein the temporary authentication token is received from the server in response to the request for the temporary authentication token.

6. The method of claim 1, wherein the account is accessible via a second device in response to the server receiving the temporary authentication token from the second device, and wherein the second device is distinct from the media playback device.

7. A system comprising:
    a processor; and
    a memory, wherein the memory stores instructions that, when executed by a processor, cause the processor to perform operations comprising:
    receiving, at a media playback device from a server, a first temporary authentication token that enables access to an account accessible via a first device, wherein the first temporary authentication token is generated after validation by the server of a particular authentication token received at the server from the first device, wherein the first device is distinct from the media playback device, and wherein the first temporary authentication token is received from the server via a communication path that does not include the first device;
    initiating a prompt to input a media playback device authentication token;
    generating a second temporary authentication token at the media playback device in response to a determination that the media playback device authentication token received at the media playback device is invalid or in response to a request received at the media playback device, the request associated with the second temporary authentication token, wherein the second temporary authentication token enables access to an interactive television system via the media playback device;
    transmitting the second temporary authentication token to the server; and
    initiating, at the media playback device, presentation of the first temporary authentication token via an interface device coupled to the media playback device in response to a determination that the media playback device received the second temporary authentication token.

8. The system of claim 7, wherein the operations further comprise:
    receiving, at the media playback device, a first authentication token from a user input device, wherein the first authentication token does not enable access to the interactive television system via a private network; and
    validating a second authentication token media playback device, wherein the second temporary authentication token is generated in response to the second authentication token being validated, and wherein the second authentication token is received from the user input device.

9. The system of claim 8, wherein the second temporary authentication token is accessible from the server via the account.

10. The system of claim 8, wherein the operations further comprise initiating a communication to a destination device associated with the media playback device, wherein the second temporary authentication token is provided during the communication.

11. The system of claim 8, wherein the operations further comprise providing the second temporary authentication token from the media playback device to the server when the server determines that the server received a call from a device having a caller identification number associated with the media playback device.

12. The computer-readable storage device of claim 8, wherein a determination that the media playback device authentication token is valid enables access to the interactive television system via the private network associated with the media playback device.

13. A method comprising:
receiving, at a server, a first authentication token associated with an account from a first device;
generating, at the server, a first temporary authentication token after the first authentication token is validated, wherein the first temporary authentication token enables access to the account;
providing the first temporary authentication token from the server to a media playback device, wherein the media playback device is distinct from the first device, and wherein the first temporary authentication token is provided to the media playback device via a communication path that does not include the first device; and
receiving, at the server, a second temporary authentication token generated by the media playback device, wherein the second temporary authentication token is generated in response to a determination that a media playback device authentication token received at the media playback device is invalid or in response to a request received at the media playback device, the request associated with the second temporary authentication token, and wherein the second temporary authentication token enables access to an interactive television system via the media playback device.

14. The method of claim 13, further comprising transmitting the first temporary authentication token based on information associated with the account, wherein the information identifies an email address, a telephone number, a postal address, or a combination thereof.

15. The method of claim 13, further comprising:
receiving, at the server, a second authentication token to attempt to enable access to the account, wherein the second authentication token is received prior to the first authentication token;
determining that the second authentication token is invalid to enable access to the account; and
validating the first authentication token after a determination that the second authentication token is invalid, wherein a second prompt for the first authentication token is initiated after the determination that the second authentication token is invalid.

16. The method of claim 15, wherein the second authentication token includes a password, a personal identification number, a pass key, a pass code, a biometric input, or a combination thereof, wherein the first authentication token includes an answer to a security question, and wherein the first temporary authentication token includes a one-time access key that is generated based on a time based variable.

17. The method of claim 13, wherein validation of the first authentication token does not enable access to the account.

18. The method of claim 13, further comprising, after determining that the first temporary authentication token received at the server from a second device is valid, initiating a second prompt to set a second authentication token to enable access to the account via a web page associated with the account.

19. The method of claim 13, further comprising:
determining that the media playback device is associated with the account; and
transmitting the first temporary authentication token to the media playback device in response to a determination that the first authentication token is valid.

20. The method of claim 13, further comprising transmitting the second temporary authentication token to a second device.

* * * * *